I. M. & E. R. RADABAUGH.
MOISTENER.
APPLICATION FILED JULY 15, 1914.

1,200,023.

Patented Oct. 3, 1916.

WITNESSES:
Pauline Schulz
Ethel Westfall

INVENTORS
Ira M. Radabaugh
Elain R. Radabaugh
BY
L. L. Westfall
ATTORNEY

UNITED STATES PATENT OFFICE.

IRA M. RADABAUGH AND ELVIN R. RADABAUGH, OF HILLYARD, WASHINGTON.

MOISTENER.

1,200,023. Specification of Letters Patent. Patented Oct. 3, 1916.

Application filed July 15, 1914. Serial No. 851,161.

*To all whom it may concern:*

Be it known that we, IRA M. RADABAUGH and ELVIN R. RADABAUGH, citizens of the United States of America, residing at Hillyard, in the county of Spokane and State of Washington, have invented certain new and useful Improvements in Moisteners, of which the following is a specification.

This invention pertains to carbureters and has for its object to provide a construction auxiliary to a carbureter, to be attached thereto, whereby a certain amount of moisture is added to the air and gasolene feed with a view of getting the maximum amount of force from the explosion as well as to help to keep the cylinder clear of carbon, and to add to the general running qualities of the engine.

The general plan of the device is to provide a moisture feed to be attached to the air inlet of the carbureter, the amount of moisture to be supplied being governed by the construction shown together with the increased or decreased amount of suction caused by the varying speed of the engine.

The details of construction and operation of parts will be hereinafter particularly described and illustrated in the accompanying drawings, in which—

Figure 1:
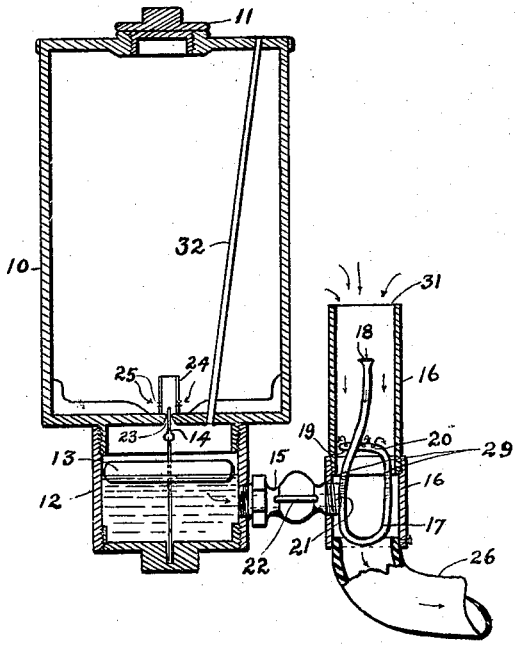
Figure 2:
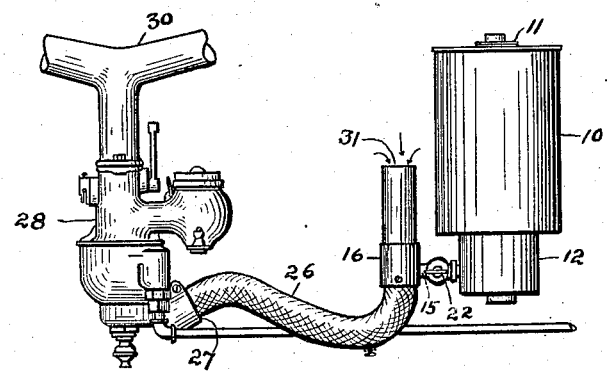

Figure 1, is a vertical sectional view of the device together with a broken-away view of a flexible conduit for attachment to the carbureter air intake, and Fig. 2, is a side elevation of the device, a carbureter and the flexible connection between the two.

A tank 10 is provided as a container for moistening fluid, preferably water, and is filled at the opening covered by the threaded cap 11. Subjacent to the tank 10 and connected therewith is a receptacle 12 in which is mounted a float 13 carrying a needle valve 14.

Connected with the receptacle 12 by means of a pipe 15, is a tube 16 in which is mounted a tubular coil 17 having a funnel shaped opening 18 at one end, the other end 19 being closed. A portion of the coil 17 is perforated, as at 20. The coil 17 is connected with the pipe 15 inside of the tube 16, as at 21. A shut-off valve 22 is provided in the pipe 15. The needle valve 14 is adapted to fit the opening 23 in the bottom of the tank 10. In order to protect the opening 23 as against the splashing of the liquid in the tank 10 a cap 24 is placed over the same, the cap being provided with openings 25 through the same to permit of the passage of the liquid to the opening 23.

A flexible conduit 26 connects the bottom of the tube 16 with the air intake pipe 27 of the carbureter 28. Air is supplied to the receptacle 12 through a pipe 32 passing through the tank 10.

In the practical application of the device, moistening fluid is filled into the tank 10, which finds its way through the openings 25 and the needle valve opening 23 to the receptacle 12, thence through the pipe 15 to and into the tubular coil 17, the height of the fluid in the coil 17 being governed by the float 13 in the receptacle 12 and normally will be at about the points 29. The air entering the engine through the manifold 30 attached to the carburter 28 must now seek entrance through the opening 31 into the tube 17, thence through the flexible conduit 26 to and through the carbureter 28 passing in the direction of the arrows. A portion of the air drawn into the tube 16 enters the funnel shaped opening 18 of the tubular coil 17 and finds its way through the tubular coil 17 to and out at the perforations 20, carrying drops of water with it, the water then being carried through the tube 16, the flexible conduit 26, the carbureter 28 and the manifold 30 to the engine, mixing with air and gasolene in the carbureter and manifold.

We find by personal experience that by the construction disclosed we are enabled to supply the amount of moisture required and desired to suit the speed of the engine inasmuch as the draft through the tube 16 governs the same.

What we claim is,

1. A moistener comprising a substantially vertically arranged tube open at both ends, a tubular coil mounted in said tube, said tubular coil having one end thereof extended upwardly above the body of the coil, such end being open, the other end of said coil being closed and arranged substantially horizontally with perforations therein, a connection with said tubular coil at a point beneath said perforations leading to a source of liquid supply and means for maintaining a liquid level in said tubular coil at a point beneath said perforations.

2. A moistener comprising a substantially vertically arranged tube open at both ends, a tubular coil mounted in said tube, said tubular coil being open at one end and closed at the other, a portion of said coil being substantially horizontally arranged and having perforations therein, a connection with said tubular coil at a point beneath said perforations leading to a source of liquid supply and means for maintaining a liquid level in said tubular coil at a point beneath the perforated portion, the open end of said coil being at a point above the liquid level therein.

In testimony whereof we affix our signatures in presence of two witnesses.

IRA M. RADABAUGH.
ELVIN R. RADABAUGH.

Witnesses:
C. E. BERGLUND,
JOSEPH MCCARTHY.